US010541823B2

(12) United States Patent
Johnson et al.

(10) Patent No.: US 10,541,823 B2
(45) Date of Patent: Jan. 21, 2020

(54) SIMULTANEOUS REMOTE CONNECTION OF HETEROGENEOUS CONFERENCING SYSTEMS TO THE SAME CONFERENCE

(71) Applicant: Blue Jeans Network, Inc., Mountain View, CA (US)

(72) Inventors: Nicklas R. Johnson, San Mateo, CA (US); Benjamin J. Hutchison, Santa Clara, CA (US)

(73) Assignee: Blue Jeans Network, Inc., San Jose, CA (US)

( * ) Notice: Subject to any disclaimer, the term of this patent is extended or adjusted under 35 U.S.C. 154(b) by 318 days.

(21) Appl. No.: 15/675,338

(22) Filed: Aug. 11, 2017

(65) Prior Publication Data
US 2019/0052472 A1  Feb. 14, 2019

(51) Int. Cl.
*H04L 12/18* (2006.01)
*H04L 12/58* (2006.01)
*H04L 29/06* (2006.01)
*H04N 7/15* (2006.01)

(52) U.S. Cl.
CPC .......... *H04L 12/1818* (2013.01); *H04L 51/04* (2013.01); *H04L 65/403* (2013.01); *H04N 7/15* (2013.01)

(58) Field of Classification Search
CPC ... H04L 12/1818; H04L 51/04; H04L 65/403; H04L 65/1083; H04L 65/1046; H04N 7/15; H04N 7/152; G06F 8/38; G06F 8/61; G06F 9/45533
See application file for complete search history.

(56) References Cited

U.S. PATENT DOCUMENTS

| 8,767,593 | B1* | 7/2014 | Allen | 370/260 |
| 9,621,853 | B1* | 4/2017 | Yang | H04L 65/80 |
| 2014/0333713 | A1* | 11/2014 | Shoemake | H04L 65/1069 348/14.05 |
| 2016/0344777 | A1* | 11/2016 | Fahlgren | H04L 65/1059 |

* cited by examiner

*Primary Examiner* — Todd L Barker
(74) *Attorney, Agent, or Firm* — Ascenda Law Group, PC (57) ABSTRACT

Video conferencing is provisioned with, for example, procedures for simultaneously connecting two or more endpoints to the same video conference. Such procedures may be particularly useful for automatically initiating a video conference involving room system endpoints.

14 Claims, 8 Drawing Sheets

SIMULTANEOUS REMOTE CONNECTION OF HETEROGENEOUS CONFERENCING SYSTEMS TO THE SAME CONFERENCE

FIELD OF THE INVENTION

The present invention is directed to approaches for enabling simultaneous remote connections to a conference hosted by a video conferencing system.

BACKGROUND

When a conference involves three or more endpoints, the experience of joining the conference can be irritating for participants who are attempting to join the conference as well as people already joined to the conference. For example, some participants may have technical difficulties in joining the conference, particularly when using a traditional-hardware room system with a cumbersome user interface. Other participants may simply be late to the conference, and upon joining may interrupt an ongoing conference. For example, in some conferences, beeps and announcements disrupt the user experience of participants already joined to the conference. There is a need for approaches to improve the user experience when connecting multiple endpoints to a video conference by minimizing technical difficulties (e.g., from coping with different types of endpoints and the associated differing procedures for connecting them to a conference) and allowing coordinated connection to the conference. The present application discloses embodiments that address aspects of this need.

SUMMARY

Embodiments are described for facilitating joining multiple types of endpoints to the same conference, for example, automatically and/or simultaneously. In some embodiments, an orchestration server for a video conferencing service accepts new registration information comprising endpoint information associated with one or more endpoints of a plurality of video-conference endpoints, wherein various ones of the video-conference endpoints of the plurality may be associated with a traditional-hardware room system or a cloud-managed room system. The orchestration server may provide the endpoint information to a data store. The orchestration server may then receive a multi-dial request comprising a specification of the plurality of endpoints and a meeting identifier for a video conference. Those of the endpoints that are associated with traditional-hardware room systems will be associated with an instance of a listener service co-located with the respective endpoint. Those of the endpoints that are associated with cloud-managed room systems will have unique resource identifiers (URIs) which identify those respective endpoints. For each respective endpoint of the plurality of endpoints, the orchestration server may provide, e.g., simultaneously or in parallel, a respective dial command comprising the meeting identifier, wherein: if the respective endpoint is associated with a traditional-hardware room system, the respective dial command is provided to the instance of the listener service; otherwise, the respective dial command is provided to the cloud-managed endpoint service. The orchestration server may then accept a plurality of responses corresponding to the respective dial commands and provide a result based on those responses to, e.g., the source of the multi-dial request.

DETAILED DESCRIPTION

Embodiments of apparatuses, computer systems, computer readable mediums, and methods for efficiently joining multiple endpoints of varying types to a video conference hosted by a video conference service are described. When a single video conference is expected to have many attendees in multiple different locations, it may be highly desirable to facilitate the joining of each endpoint at each location into the same conference simultaneously. This can minimize disruption at the start of a meeting, and may simplify an administrator's task of joining these endpoints together, instead of joining each endpoint one-at-a-time. In some embodiments, the endpoints may be of a heterogeneous nature—for example, some endpoints may be traditional-hardware room systems, and some endpoints may be cloud-managed room systems. In some embodiments, an orchestration server is used to coordinate provisioning or registration of each endpoint, and later simultaneous joining of multiple types of endpoints to the same video conference. As used herein, "simultaneously" means at the same time, initiated at approximately the same time, executed in parallel, or characterizes executing a series of instructions in sequence without waiting for a response concerning the previous instruction in the series.

As used herein, a traditional-hardware room system is a dedicated, standalone hardware device capable of initiating calls using SIP or H.323 protocols without requiring the intervention of an external management system (e.g., the intervention of a cloud service). A traditional-hardware room system may receive control messages via a listener service. The listener service may be instantiated on a server hosting other aspects of the room system, or a separate server that is not part of any room system per se. but is communicatively coupled to one or more room systems via a network. In this way, a single listener service may interact with multiple room systems, for example, a plurality of room systems that are distributed in a particular geographic area or on a particular network. While the location of a listener service may be based on geographic proximity, it need not be. All that is required is that the listener service be communicably coupled with the relevant room systems. The listener service instance is configured to receive command instructions as an interface to the traditional-hardware room system. The listener service may use Public/Private Key Encryption to secure passwords for access to the room system devices. Examples of traditional-hardware room systems include: a Cisco/Tandberg C20, C40, C60, EX60, EX90, SX10, SX20, IX5000, DX80, 6000 MXP; a Lifesize Icon 400 or Icon 600, Express 220, Room 220, Team 220; a Polycom RealPresence Group 300, 500, or 700, RealPresence Debut, HDX 6000 HD, 7000 HD, 8000 HD, 9000, VSX; a StarLeaf GT Mini 3330; and a Tely 200 or telyHD Pro.

As used herein, a cloud-managed room system is a room system that is controlled via a cloud-managed service, and uses the cloud-managed service to initiate calls. This type of room system is provisioned via a cloud-hosted service. Examples of cloud-managed room systems include the BlueJeans Huddle.

The video conference system enabling the video conference service may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

These interactions/communications across devices encompass the control of a video conference session, its configuration, the visual layout of the data streams from the conference participants, customization of the user interface, and adaptation of a video conference to integrate with and present data streams from different client applications (e.g., chat, screen sharing, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

Figure 1:
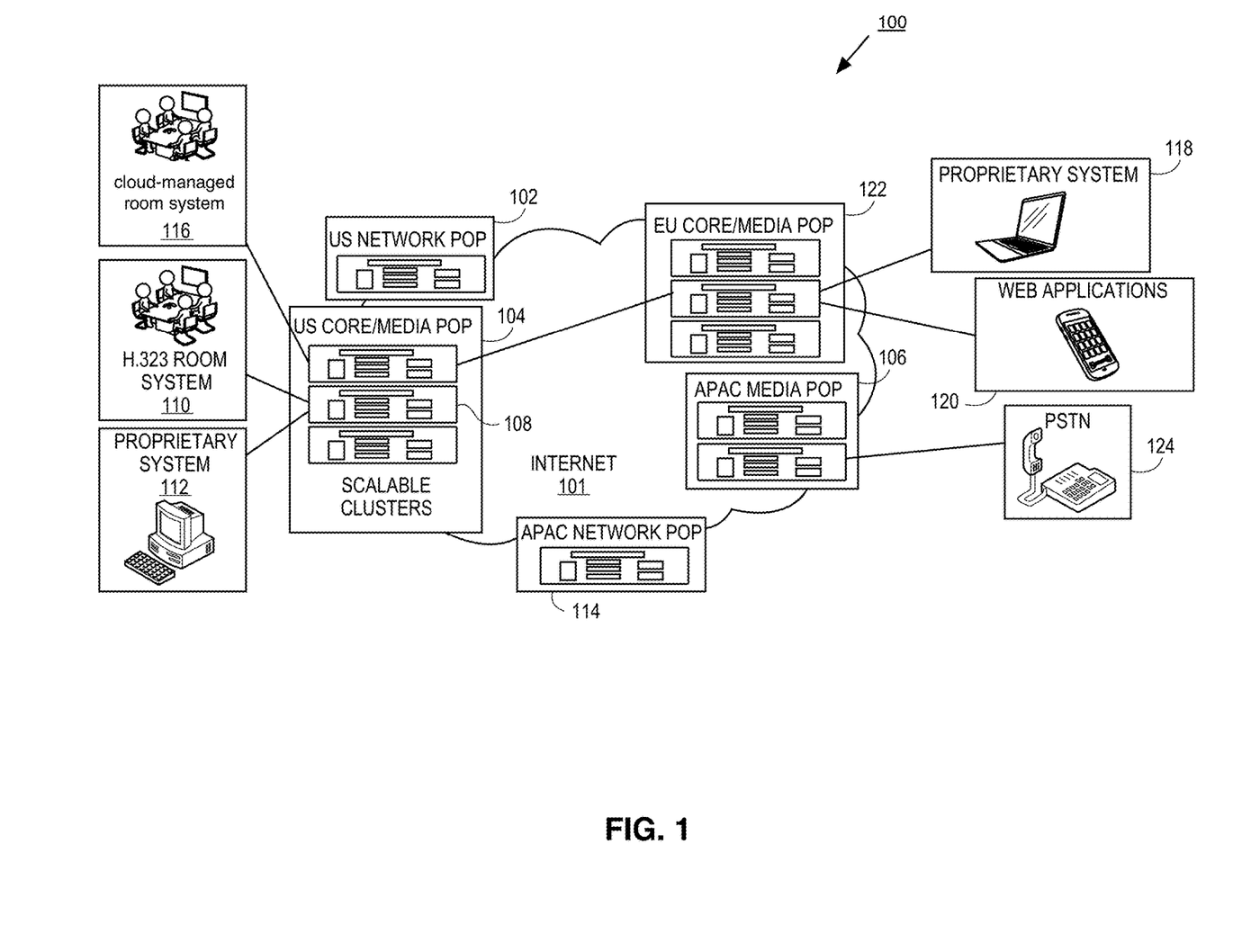
FIG. 1 depicts an exemplary video conferencing system in accordance with some embodiments of the invention.

FIG. 1 depicts an exemplary video conferencing system 100, in accordance with some embodiments of the invention. The video conferencing system 100 may include one or more points of presence (POPs—e.g., POPs 102, 104, 106, 114, and 122). The POPs may be respectively organized to comprise scalable clusters of nodes, such as media processing nodes 210, as described in connection with FIG. 2 below. Media processing nodes are used to process and compose video conference feeds from various endpoints (e.g., 116, 110, 112, 118, 120, and 124). In certain embodiments, media processing nodes are multipoint control units (MCUs). In certain embodiments, the media processing nodes associated with a POP may work together (and, in some embodiments, work with other POP components) to collectively function as a MCU. In certain embodiments, media processing nodes may be implemented with off-the-shelf components, such as Linux/x86 Central Processing Units (CPUs) and PC Graphics Processing Units (GPUs) instead of custom hardware. Video conferencing system 100 may be used for media stream distribution and processing via network 101—e.g., that may be achieved locally on a Local Area Network (LAN) present in each POP and/or across multiple POPs on the Wide Area Network (WAN) or the internet.

In some embodiments, video conferencing system 100 may be implemented with clusters of x86 servers (e.g., server 108) both locally on a LAN as well as across geographies serving as the media processing nodes for the MCUs to achieve optimal scaling. Endpoints may be, for example, room systems using H.323 (as shown with 110), cloud-managed room systems such as a BlueJeans Huddle room (as shown with 116), PCs using H.323 or SIP, and PCs or mobile devices running Skype or Microsoft Lync (as shown with proprietary system endpoint 112).

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
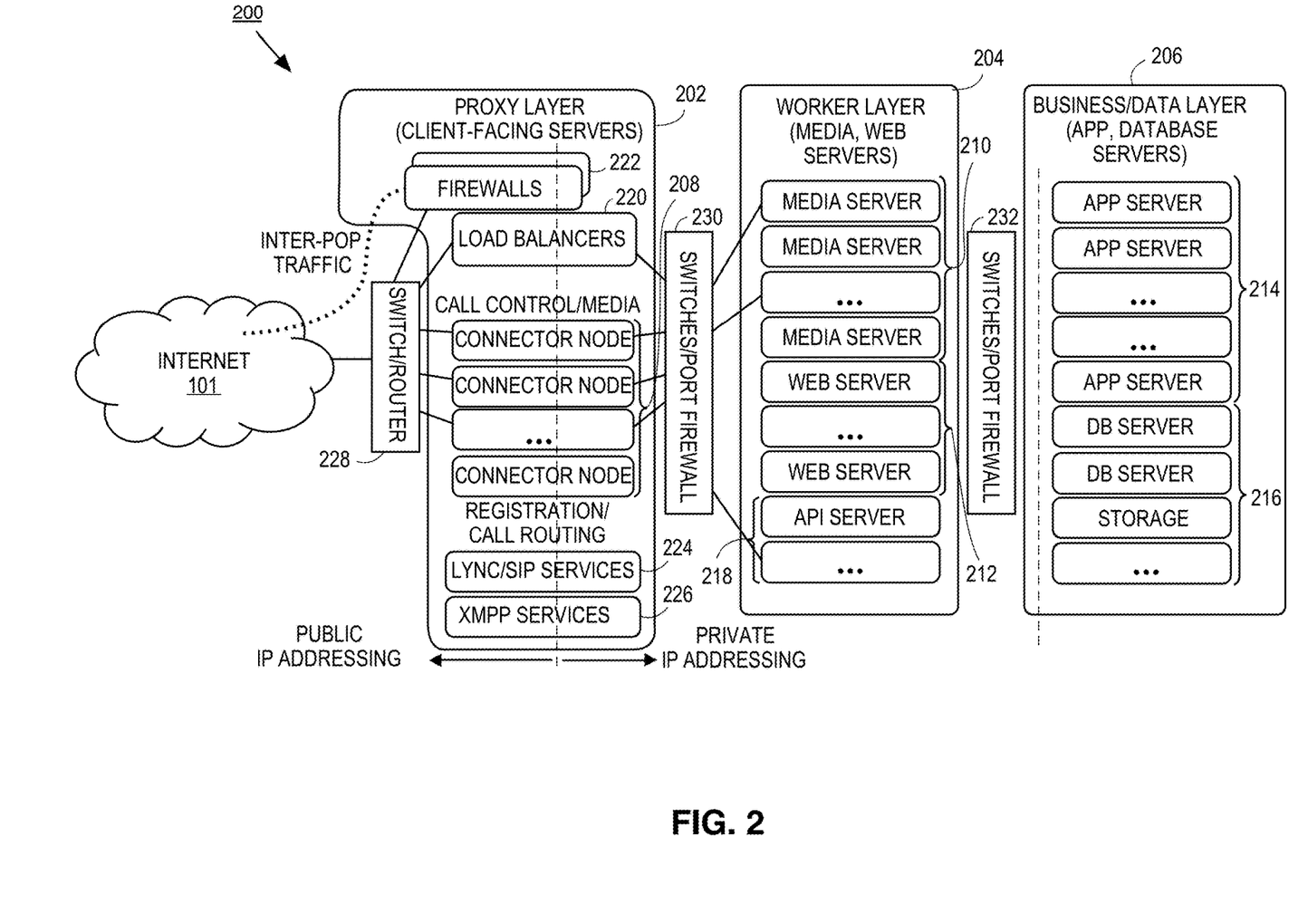
FIG. 2 depicts an exemplary POP media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces.

Figure 3:
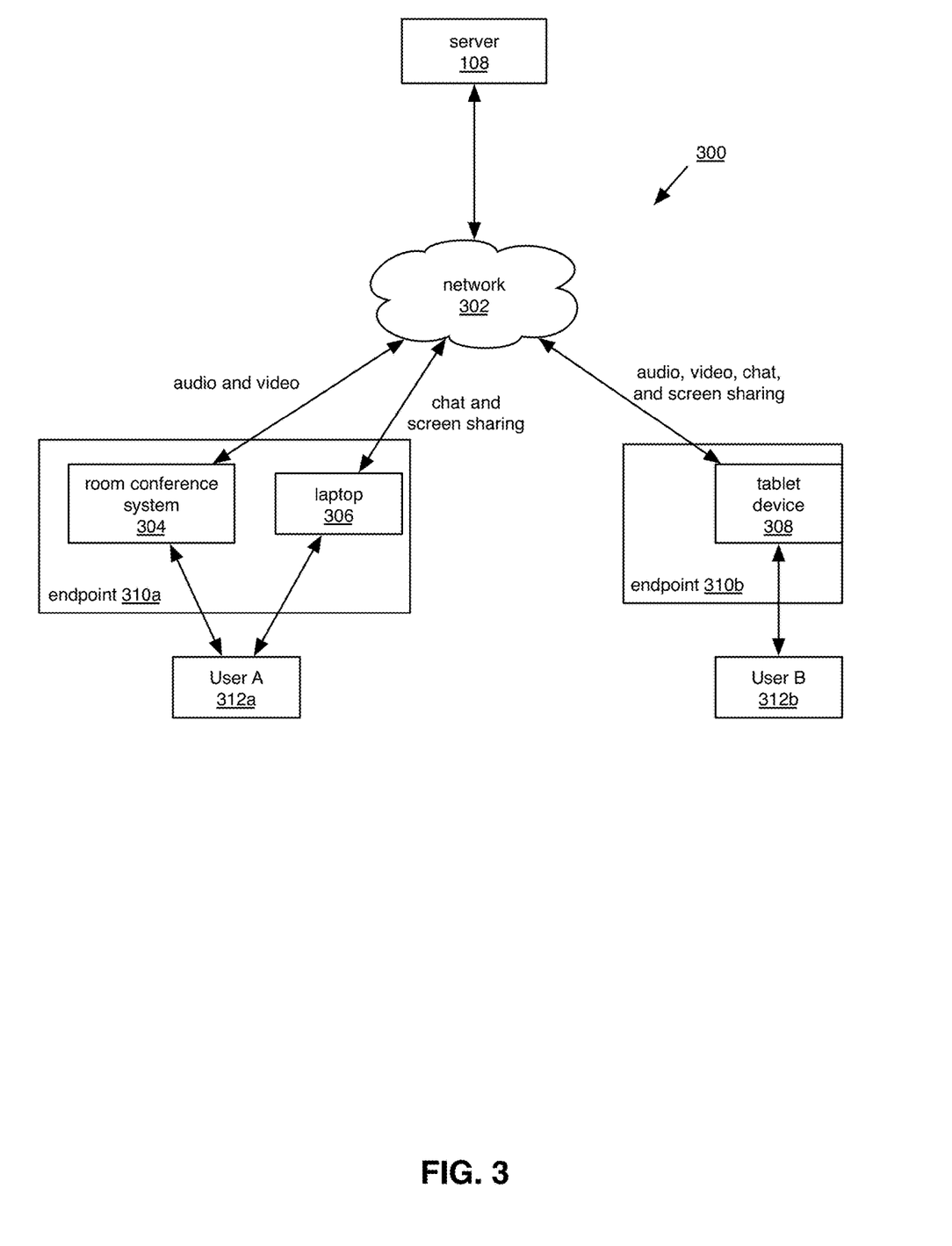
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet device or laptop that can be used for screen sharing, and (iii) a smart phone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). For example, if a video conference involves a room conference system with limited capabilities (e.g., no chat possible), a mobile device (e.g., mobile phone, tablet computer, laptop computer, etc.) can be used to supplement the capabilities of the room conference system (e.g., provide chat). In certain embodiments, any endpoint may join the video conference by sending a request to join the conference to the system 100 (e.g., to a client-facing server of POP 200), e.g., from a user interface of a client device. Such a request to join the conference may be provided if the endpoint is not automatically joined to the conference via a process such as process 600, described below.

Server 108 may support a set of capabilities, such as audio, video, chat, screen sharing and the like, for each user. A user can join a video conference with a first device that is capable of supporting audio/video and a second device that is better suited for content sharing and chat. Server 108 may associate a first user with both the first and second devices, and consequently can determine the communication modes (i.e., audio, video, content sharing and chat) that are associated with the first user. Server 108 may be a component of video conferencing system 100, such as a server of POP media processing node architecture 200. Network 302 may be a WAN, the internet, a telecommunications network, a LAN, or the like.

In certain embodiments, the user may identify himself/ herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition and/or alternatively, pairing may be heuristically determined by the server. For instance, server 108 may detect similar audio signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
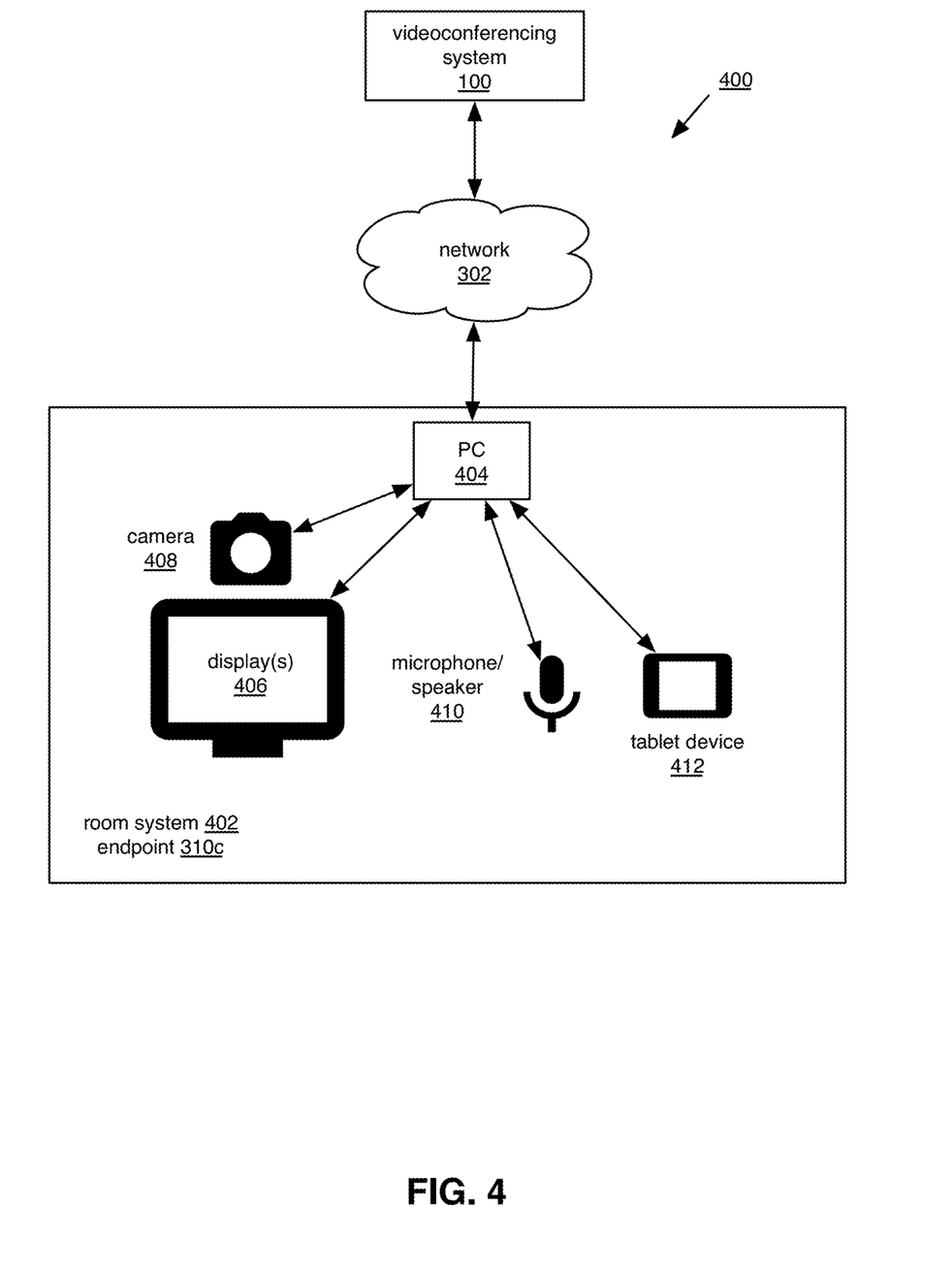
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer 404, one or more displays 406, a camera 408, a microphone and speaker 410, and a tablet device 412. Personal computer 404 may act as a hub for mediating data communications between some or all of the components of the room system endpoint 310c, and may be, for example, a small form-factor computer such as a Mac Mini or an Intel NUC (Next Unit of Computing) computer. Displays 406 may be a television, a monitor, or a projector and projector screen. The microphone and speaker may be contained in a single device or multiple devices; in certain embodiments, the room system 402 may include multiple microphones and speakers. Tablet device 412 (alternatively, another mobile device such as a smartphone) may provide a user interface for controlling the video conferencing experience at room system 402.

Figure 5:
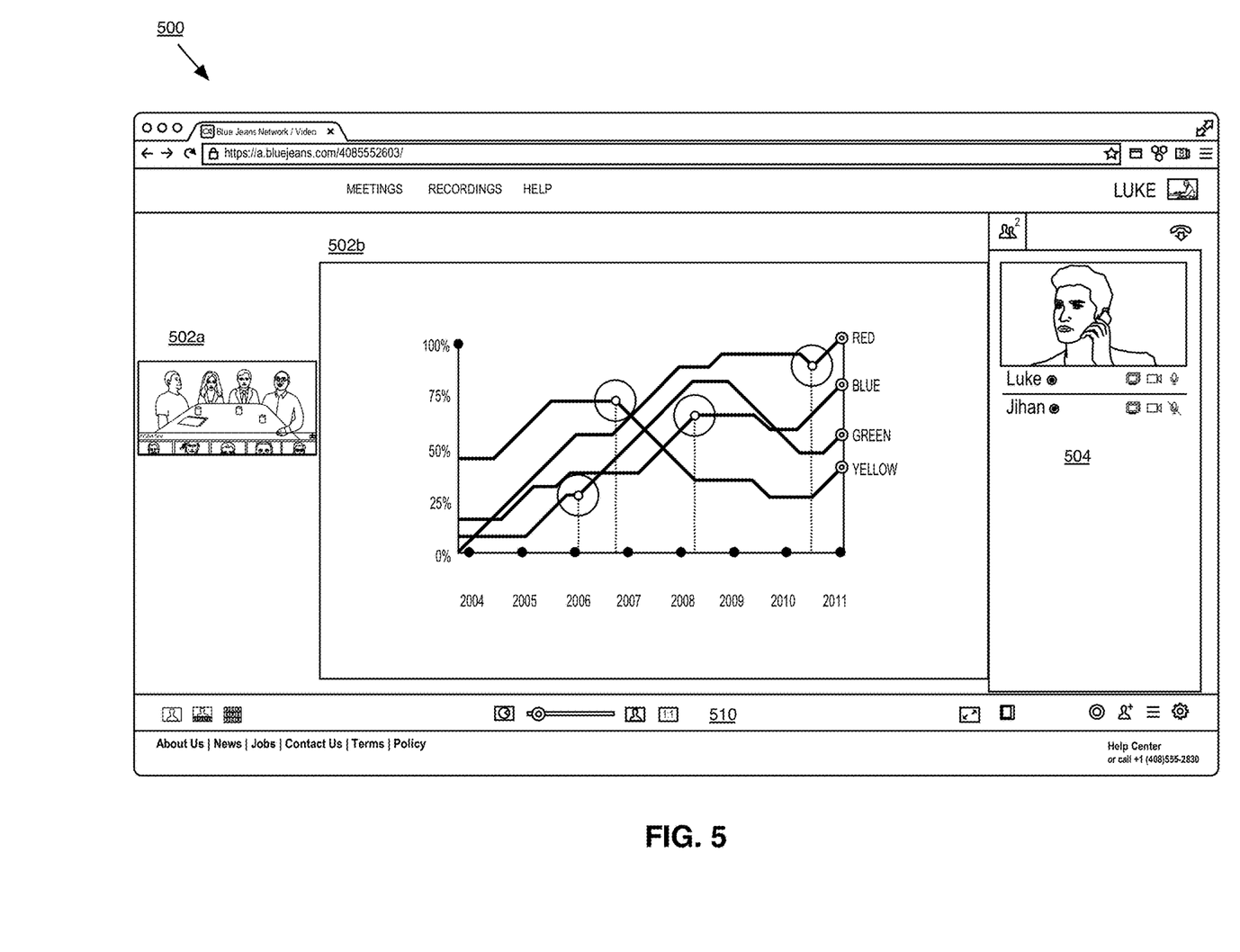
FIG. 5 depicts an exemplary user interface in accordance with some embodiments of the invention.

FIG. 5 shows an exemplary user interface 500 for participating in a teleconference at an endpoint, for example via a display 406. User interface 500 may be an HTML or browser-renderable interface. User interface 500 may include one or more video streams 502—for example, video stream 502a, showing a feed from a camera aimed at participants at an endpoint (such as via room system 304 at endpoint 310a), and video stream 502b, showing a "screen sharing" stream (e.g., a stream mirroring the display of a device at an endpoint such as a laptop 306, in a circumstance where user interface 500 is presented to a user at a different endpoint (such as User B 312b at endpoint 310b). User interface 500 may additionally include a panel 504 indicating information about participants to the video conference, and a user interface control 510 for setting the appearance of the video stream layout, such as setting the relative sizes as displayed of categories of video streams (as shown in FIG. 5, a presentation category of stream (e.g., stream 502b) is selected to occupy a larger amount of space within the user interface relative to a participant-view category (e.g., stream 502a)).

Figure 6:
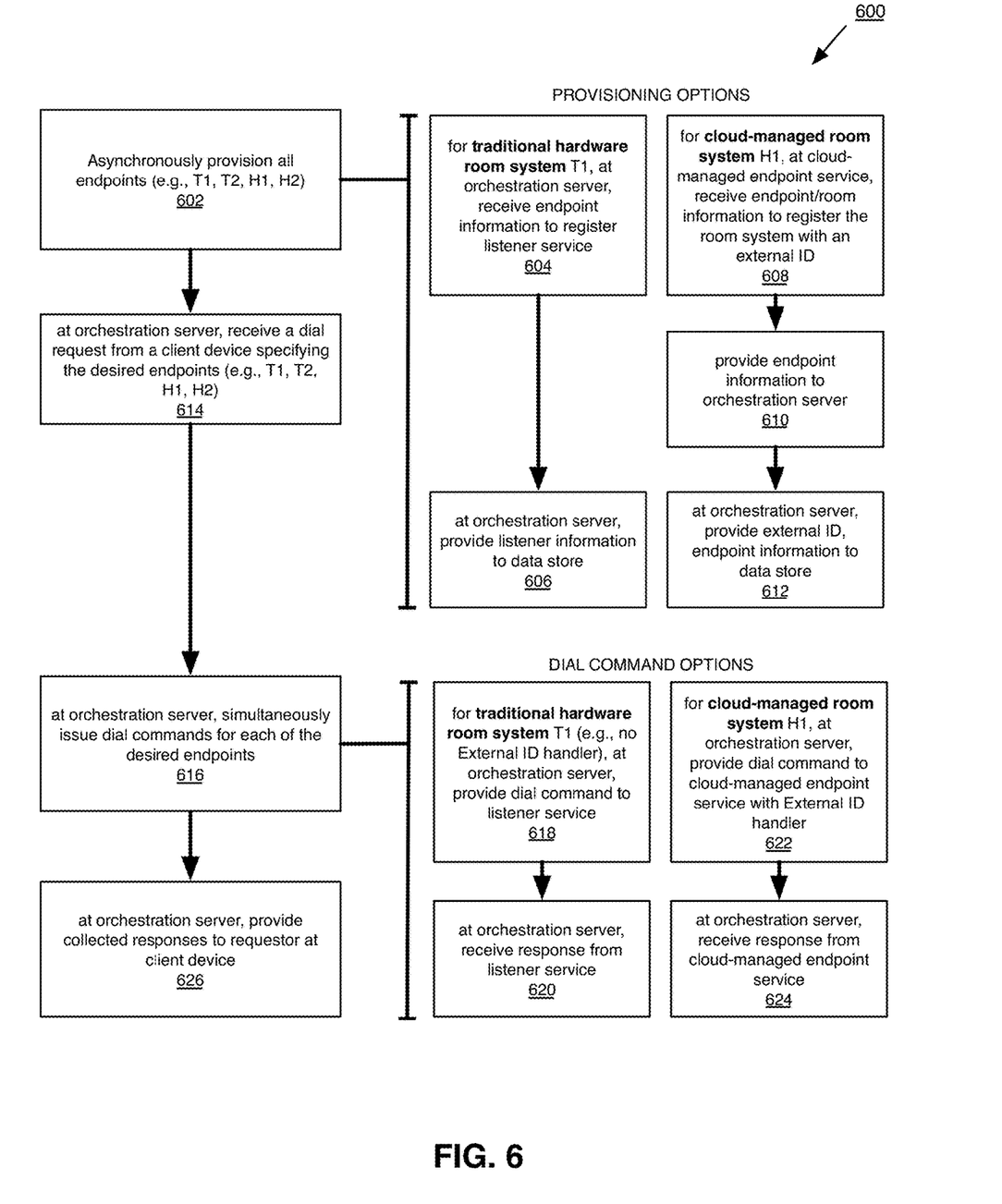
FIG. 6 shows a flow chart for an exemplary process concerning providing a teleconference involving provisioning and automatically connecting endpoints to a video conference in accordance with some embodiments of the invention.

FIG. 6 shows a flow chart for an exemplary process 600 concerning provisioning and automatically connecting endpoints to a video conference. Prior to joining endpoints to a video conference, the endpoints that may be eligible for automatic, simultaneous connection to a conference should be provisioned or registered (602). This provisioning may occur asynchronously. Such eligible endpoints may include, for example, traditional-hardware room systems and cloud-managed room systems. Different types of endpoints may be provisioned according to different procedures. For example, if the type of endpoint is a traditional-hardware room system, information about the endpoint is provided to an orchestration server of video conferencing service 100 (e.g., orchestration server 704 in FIG. 7 described below) (604). The orchestration server is typically located remotely from the endpoints (e.g., hosted in the cloud), however, in certain embodiments, it may be located on the same enterprise network as one or more of the endpoints. In certain embodiments, one or more endpoints may be provisioned via a client device (e.g., a client device operated by user 702) that is not associated with an endpoint, and in some embodiments, an endpoint may be provisioned using an endpoint-associated device (e.g., laptop 306 in FIG. 3). In certain embodiments the endpoint information is provided via a cloud service. Information about the endpoint may include an identifier for the listener service to use (for example a listener service associated with a geographic location such as Mountain View or London), a descriptive name for the endpoint (e.g., a name such as "1$^{st}$ floor Conference Room" to use in a scheduling user interface), an internet protocol (IP) address for the endpoint, the endpoint type (for example, traditional-hardware room system, or cloud-managed room system), credentials for the endpoint (e.g., username and password for access to the endpoint device(s)), a description of the endpoint device(s) (e.g., manufacturer and model), and calendar information (such server address and login information), e.g., for a calendar used to schedule use of the room system/endpoint. The orchestration server saves the endpoint information in a database (e.g., data store 706) (606).

If the type of endpoint is a cloud-managed room system, the endpoint will register via a remote cloud-managed endpoint service (e.g., cloud-managed endpoint service 710) (608). A cloud-managed endpoint service controls associated endpoints without requiring an on-premises listener service. In turn, the cloud-managed endpoint service will associate an external identifier with the endpoint. When an endpoint is added to the cloud-managed endpoint service, the service will create an instance of an endpoint inside the orchestration server which contains an external identifier (e.g., in the form of a uniform resource identifier (URI)), indicating that it is the controlling entity for the endpoint and not a listener service. Endpoint information may include the external identifier, as well as information concerning the type of endpoint and other information, as desired. The endpoint information is provided by the cloud-managed endpoint service to the orchestration server (610), which stores the endpoint information in the database (612).

Provisioned endpoints may be available as subjects of a multi-dial request. For example, an end user (e.g., user 702) may instigate a single call to the orchestration server, providing it with a numeric meeting identifier to which all endpoints should join, along with a list of identifiers belonging to each of the endpoints from the orchestration server's database that the end user desires to be a part of the video conference. Accordingly, the orchestration server may receive a multi-dial request from a client device that specifies the endpoints to be simultaneously connected to a video conference (614). The multi-dial request additionally specifies an identifier for the video conference or meeting identifier. The endpoints are identified in the dial request by, for example, their individual endpoint identifiers, and, optionally, a label for the endpoint such as "Mountain View Board Room". In certain embodiments, a client device may be used to present a user interface displaying a searchable list of selectable representations of available endpoints (e.g., identified by room name or geographic location or the name of a person); upon selection of multiple endpoint representations, the client device may provide the request (the request incorporating respective identifiers for the selected endpoints) to the orchestration server.

Upon receiving the multi-dial request from the client device, the orchestration server may obtain information for each endpoint specified in the request from the database, use the information to formulate the dial commands, and simultaneously issue dial commands for each of the endpoints specified in the request (616). In certain embodiments, by "simultaneously issue", this means that the orchestration server will not wait for a response concerning each endpoint before sending the next dial command in the list. In certain embodiments, dial commands may include a passcode or other credentials for accessing the endpoint device(s), or address information associated with the endpoint such as an IP address.

The steps for issuing each endpoint dial command may depend upon the type of endpoint. For example, the endpoints referenced by the dial commands may be inspected to determine whether they have external identifiers, and if those external identifiers are associated with registered handlers (e.g., handlers for a cloud-managed endpoint service). If the respective endpoint is a traditional-hardware room system, the orchestration server may provide the dial command to an instance of the listener service (e.g., listener service instance 708), which in turn may instruct the endpoint to connect to the video conference associated with a meeting identifier (618). The result, which may include success or failure of the connection, is then returned to the orchestration server via the listener service (620). If the relevant endpoint is a cloud-managed endpoint, the orchestration server may issue the dial command to the cloud-managed endpoint service (e.g., directing the command to the appropriate handler), identifying the endpoint using its external ID (622). In turn the cloud-managed endpoint service may instruct the endpoint associated with the external ID to connect to the video conference associated with the meeting ID, and the response from that instruction may be conveyed via the cloud-managed endpoint service to the orchestration server (624).

Upon receiving responses for each endpoint, the orchestration server may provide a result to the source of the multi-dial request, e.g., the client device that initiated the dial request, based on the responses (626). In certain embodiments, a result is prepared and provided upon receipt of each response at the orchestration server. In certain embodiments, the result indicates which endpoints successfully connected to the video conference, and which did not (e.g., providing information about any connection failures). In certain embodiments, the result indicates whether each connection includes a video stream and/or an audio stream.

Figure 7:
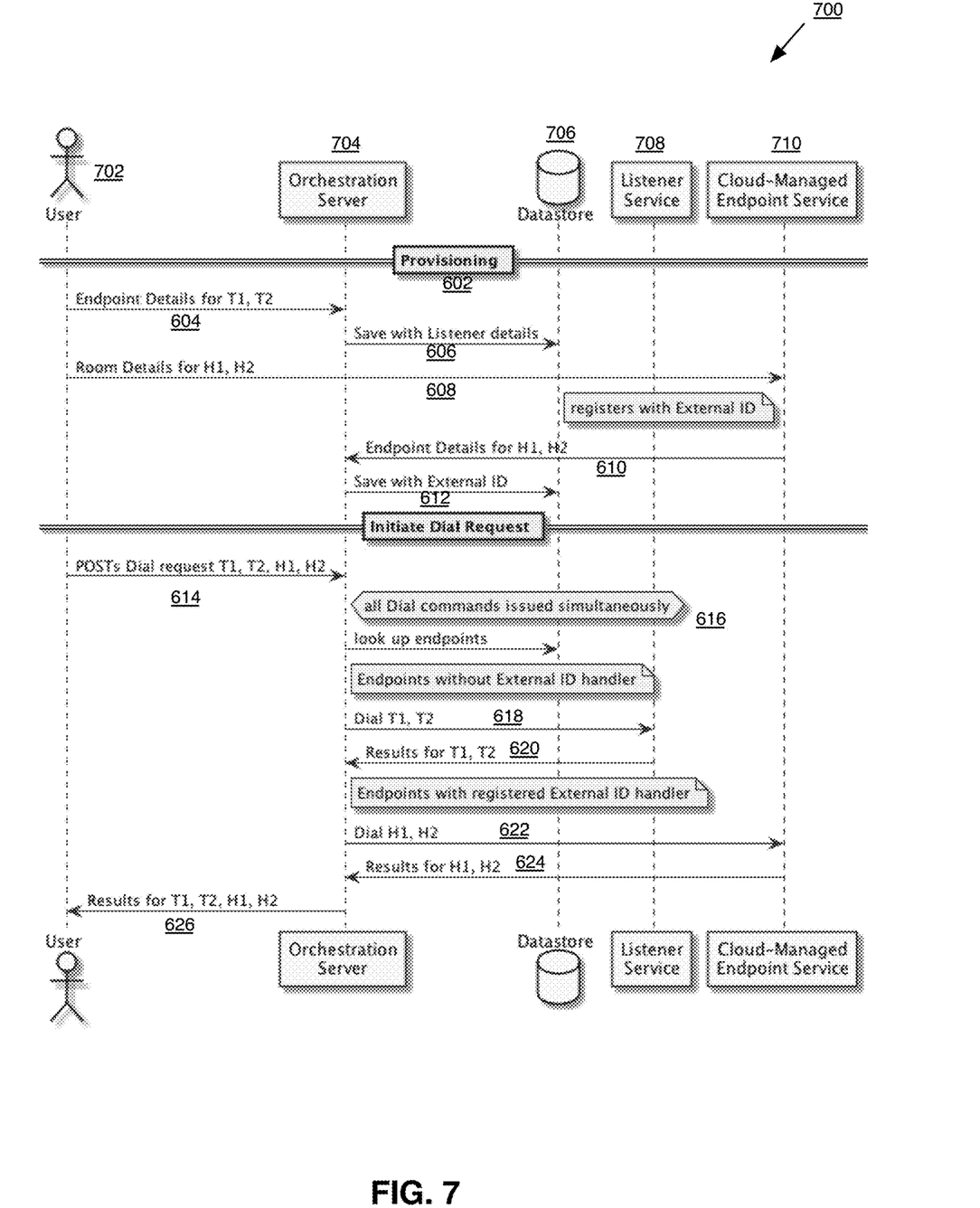
FIG. 7 shows a sequence diagram for an exemplary set of communications with a video conferencing system in accordance with some embodiments of the invention.

In certain embodiments, the orchestration server may be configured to handle a global hang up command, upon which the orchestration server will simultaneously instruct each endpoint to disconnect from the videoconference. A global hang-up command may be provided by a user at a client device (e.g., end user 702) who initiated the mass dial or multi-dial request.

FIG. 7 shows a sequence diagram for an exemplary set of communications 700 with a video conferencing system. The sequence of communications illustrates one example for using steps of process 600 to provision and then connect two traditional-hardware room systems T1 and T2 and two cloud-managed endpoints H1 and H2 to the same video conference. The illustrated communications are between an end user 702, an orchestration server 704, a datastore 706, an instance of a listener service 708, and a cloud-managed endpoint service 710.

Figure 8:
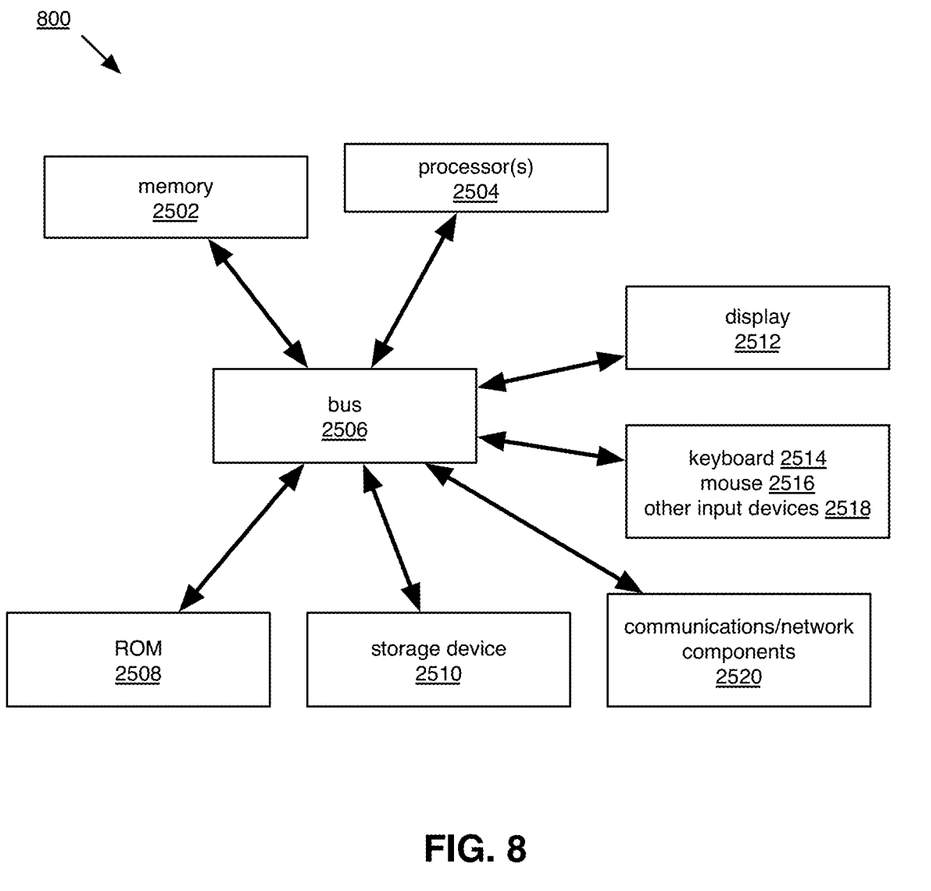
FIG. 8 shows a block diagram of an exemplary computing system in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and a processor 2504 coupled with the bus 2506 for processing information. Computer system 800 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
   accepting, at an orchestration server for a video conferencing service, new registration information comprising endpoint information associated with one or more endpoints of a plurality of video-conference endpoints, the endpoint information including an identifier for a listener service to use, each video-conference endpoint of the plurality associated with a traditional-hardware room system including a standalone hardware device capable of initiating calls using at least one of a SIP (Session Initiation Protocol) or H.323 protocol without requiring intervention of an external management system, or a cloud-managed room system;
   providing, by the orchestration server, the endpoint information to a data store;
   accepting, at the orchestration server, a multi-dial request comprising a specification of the plurality of endpoints and a meeting identifier for a video conference, wherein each respective endpoint of the plurality of endpoints is associated with (1) an instance of the listener service co-located with the respective endpoint or (2) the cloud-managed endpoint service;
   for each respective endpoint of the plurality of endpoints, simultaneously providing a respective dial command comprising the meeting identifier, wherein:
      if the respective endpoint is associated with the traditional-hardware room system, the respective dial command is provided to the instance of the listener service;
      otherwise, the respective dial command is provided to the cloud-managed endpoint service;
   accepting, at the orchestration server, a plurality of responses corresponding to the respective dial commands; and
   providing, by the orchestration server, a result based on the plurality of responses,
   wherein if any respective response of the plurality of responses indicates a connection failure, the result comprises information about the connection failure and the associated endpoint to the source of the multi-dial request, and wherein upon receiving a global hang up command, the orchestration server will initiate disconnection of each respective endpoint from the video conference.

2. The method of claim 1, wherein the multi-dial command is received from a requestor client device associated with a user account for the video conferencing service.

3. The method of claim 1, wherein the respective dial command further comprises a passcode.

4. The method of claim 1, wherein each respective instance of the listener service is executed on a server local to the respective endpoint.

5. The method of claim 1, wherein the result is provided to a client device that is the source of the multi-dial request.

6. A video conferencing system, comprising:
   a processor;

a storage device communicatively coupled to the processor; and a set of instructions on the storage device that, when executed by the processor, cause the processor to:

accept new registration information comprising endpoint information associated with one or more endpoints of a plurality of video-conference endpoints, the endpoint information including an identifier for a listener service to use, each video-conference endpoint of the plurality associated with a traditional-hardware room system including a standalone hardware device capable of initiating calls using at least one of a SIP (Session Initiation Protocol) or H.323 protocol without requiring intervention of an external management system, or a cloud-managed room system;

provide the endpoint information to a data store;

accept a multi-dial request comprising a specification of the plurality of endpoints and a meeting identifier for a video conference, wherein each respective endpoint of the plurality of endpoints is associated with (1) an instance of the listener service co-located with the respective endpoint or (2) the cloud-managed endpoint service;

for each respective endpoint of the plurality of endpoints, simultaneously provide a respective dial command comprising the meeting identifier, wherein:

if the respective endpoint is associated with the traditional-hardware room system, the respective dial command is provided to the instance of the listener service;

otherwise, the respective dial command is provided to the cloud-managed endpoint service;

accept a plurality of responses corresponding to the respective dial commands; and provide a result based on the plurality of responses, wherein if any respective response of the plurality of responses indicates a connection failure, the result comprises information about the connection failure and the associated endpoint to the source of the multi-dial request, and wherein upon receiving a global hang up command, the orchestration server will initiate disconnection of each respective endpoint from the video conference.

7. The system of claim 6, wherein the multi-dial command is received from a requestor client device associated with a user account for the video conferencing service.

8. The system of claim 6, wherein the respective dial command further comprises a passcode.

9. The system of claim 6, wherein each respective instance of the listener service is executed on a server local to the respective endpoint.

10. The system of claim 6, wherein the result is provided to a client device that is the source of the multi-dial request.

11. A non-transitory machine-readable storage medium comprising instructions that, when executed by a processor, cause the processor to:

accept new registration information comprising endpoint information associated with one or more endpoints of a plurality of video-conference endpoints, the endpoint information including an identifier for a listener service to use, each video-conference endpoint of the plurality associated with a traditional-hardware room system including a standalone hardware device capable of initiating calls using at least one of a SIP (Session Initiation Protocol) or H.323 protocol without requiring intervention of an external management system, or a cloud-managed room system;

provide the endpoint information to a data store;

accept a multi-dial request comprising a specification of the plurality of endpoints and a meeting identifier for a video conference, wherein each respective endpoint of the plurality of endpoints is associated with (1) an instance of the listener service co-located with the respective endpoint or (2) the cloud-managed endpoint service;

for each respective endpoint of the plurality of endpoints, simultaneously provide a respective dial command comprising the meeting identifier, wherein:

if the respective endpoint is associated with the traditional-hardware room system, the respective dial command is provided to the instance of the listener service;

otherwise, the respective dial command is provided to the cloud-managed endpoint service;

accept a plurality of responses corresponding to the respective dial commands; and provide a result based on the plurality of responses, wherein if any respective response of the plurality of responses indicates a connection failure, the result comprises information about the connection failure and the associated endpoint to the source of the multi-dial request, and wherein upon receiving a global hang up command, the orchestration server will initiate disconnection of each respective endpoint from the video conference.

12. The non-transitory machine-readable storage medium of claim 11, wherein the multi-dial command is received from a requestor client device associated with a user account for the video conferencing service.

13. The non-transitory machine-readable storage medium of claim 11, wherein the respective dial command further comprises a passcode.

14. The non-transitory machine-readable storage medium of claim 11, wherein each respective instance of the listener service is executed on a server local to the respective endpoint.

* * * * *